Patented Mar. 11, 1952

2,588,389

UNITED STATES PATENT OFFICE 2,588,389

PROCESS OF PREPARING SILICIC ACID SOLS

Ralph K. Iler, Cleveland Heights, Ohio, assignor to E. I. du Pont de Nemours & Company, Wilmington, Del., a corporation of Delaware No Drawing. Application June 19, 1948,
Serial No. 34,152

5 Claims. (Cl. 252—313)

This invention relates to the preparation of sols of silicic acid and is more particularly directed to processes in which an aqueous solution of a silicate is contacted with an insoluble cation-exchanger in its hydrogen form while maintaining a pH of 0.5 to 4.

It has heretofore been proposed in Bird Patent 2,244,325 to contact an aqueous silicate solution with an insoluble cation-exchanger in its hydrogen form. In this process the pH drops gradually as the cation of the silicate is abstracted. The products thus obtained are of considerably higher molecular weight than the silicate which is used as a starting material. For many purposes this is advantageous or is at least no disadvantage but for some uses it is desired to have a sol of very low molecular weight.

It is an object of this invention to provide processes for the production of silicic acid sols in which the silicic acid has a very low molecular weight. It is a further object to provide processes in which the silicic acid sols produced have a molecular weight not markedly greater than the molecular weight of the silicate from which they were prepared. It is a still further object to provide processes by the use of which one may simply and economically produce silicic acid sols of low molecular weight which are substantially free from salts or other contaminants. Still further objects will become apparent hereinafter.

The foregoing and other objects of the invention are attained by the use of processes in which an aqueous solution of a silicate is contacted with an insoluble cation-exchanger in its hydrogen form while maintaining a pH of 0.5 to 4.

Products thus produced will be substantially or entirely free of the cation of the silicate from which they were prepared and they will have a molecular weight not substantially greater than that of the silicate from which they were prepared. The processes of the invention are characterized by their simplicity and by the comparative ease with which they may be carried out. The advantages of a process like that of the Bird Patent 2,244,325 are secured insofar as the removal of the cation of the silicate is concerned and yet the normally attendant rise in molecular weight is avoided.

In processes of the invention an aqueous solution of any silicate may be used as a starting material for the preparation of silicic acid sols. For instance, one may prepare solutions of such alkali metal silicates as sodium or potassium. The silicate may have any ratio provided only that an aqueous solution can be prepared; for instance, sodium silicates ranging from the orthosilicate with an $SiO_2:Na_2O$ ratio of 0.5:1 up to silicates of ratio of 3.9:1. Thus one may use sodium metasilicate or a silicate of higher $SiO_2:Na_2O$ ratio such as the "waterglass" of commerce having a ratio of about 3.25. The latter is readily soluble in water and has the advantage that less sodium needs to be taken from it by the cation-exchanger.

The silicate solution used as starting material may be prepared in the customary ways and if "waterglass" is dissolved this will ordinarily be done with the use of hot water and pressure. The concentration of the silicate solution to be used may be widely varied for purposes of this invention but a solution concentration of less than about one percent of silicate is not desirable because of the larger volumes of liquid to be handled and the greater tendency at these low concentrations of the silicate to hydrolyze and polymerize. Solutions up to the limits of ready solubility may conveniently be employed.

It is to be observed that in the preparation of the alkaline silicate solution some care should be taken to avoid conditions which will accelerate polymerization. Holding the solutions at comparatively high temperatures for any length of time should be avoided and, as has just been observed, it is not desirable to use very dilute solutions. Any solution should not be allowed to stand too long before use in a process of the invention. Also in accordance with known practices the presence of fluorides should be avoided since they accelerate polymerization.

The product which is obtained according to processes of the invention will have a molecular weight not markedly different from the silicate from which it is prepared. Thus it will be seen that if a product of very low molecular weight is desired every effort must be made to obtain as a starting solution one in which the dissolved silicate is as near monomeric as possible. Alternatively, if it is not of extreme importance that the molecular weight be at a minimum then products may be used as starting materials which are of somewhat higher molecular weight. When this is done the silica sol will be correspondingly higher in its molecular weight. The processes of this invention are concerned, as has been summarized above, primarily with those processes in which an aqueous silicate solution is converted to a sol without markedly changing its degree of polymerization.

The removal of the cation, such as sodium from sodium silicate, is effected as in the Bird Patent 2,244,325 by the use of an insoluble cation-exchanger in its hydrogen form. This is done by contacting the aqueous silicate solution with the cation-exchanger.

Any insoluble cation-exchanger in its hydrogen form may be used in processes of the invention and there may be used for instance the hydrogen form of sulfonated carbonaceous exchangers or of sulfonated or sulfited insoluble phenol-formaldehyde resins or acid-treated humic material or other similar exchangers. Sulfonated coal, lignin, peat, or other insoluble sulfonated humic organic material may be used. Even more preferable are the insoluble resins made from phenols, such as those made from phenol itself, diphenylol sulfone, catechol, or naturally occurring phenols as found, for example, in quebracho, and an aldehyde, particularly formaldehyde, which are modified by the introduction of sulfonic groups either in the ring or on methylene groups. Cation exchangers which are stable in their hydrogen forms are available commercially under such trade names as "Amberlite," "Ionex," "ZeoKarb," "Nalcite," "Ionac," etc.

The exchanger is generally prepared in a granular form which is readily leached free of soluble acids or salts. If the exchangers are partially or wholly in a salt form they may be converted to their acid forms by washing with a solution of an acid such as hydrochloric, sulfuric, formic, sulfamic, or the like. Excess acid may then be rinsed from the product. A description of such materials and of their use will be found, for instance, in the Bird Patent 2,244,325 previously mentioned and also in the Hurd Patent 2,431,481. The literature is also full of references to these materials and to their applications. One of the preferred cation-exchange resins for use according to the present invention is an aromatic hydrocarbon polymer containing nuclear sulfonic acid groups which is designated "Dowex 50" and of the general type described in D'Alelio 2,366,007 and which is fully described as to its characteristics, properties, and general mode of use in the Journal of the American Chemical Society for November, 1947, volume 69, No. 11, beginning at page 2830.

Processes of the invention are characterized by the fact that contact between an aqueous silicate solution and an ion-exchanger is effected at a pH between 0.5 and 4. More specifically it is preferred to use a pH from 1 to 3.

The pH can thus be controlled most readily by first adding the cation-exchanger to an aqueous solution of a soluble acid. The acidity of the solution can readily be adjusted to fall within the ranges indicated and the aqueous solution of a silicate is added no faster than the cation-exchanger can remove cation and maintain the pH within the ranges already noted.

It will be evident that the rate of addition of the aqueous silicate solution will depend upon the quantity of cation-exchanger and the volume of the aqueous acid solution. The system must be well mixed at all times so that there will not be local zones which are at a pH above the range desired.

The system is preferably maintained at a moderately low temperature, say, 0 to 40° C. The lower the temperature used the less polymerization will occur during the process. Within the temperature ranges indicated there will not be a marked increase in molecular weight during the normal time required to abstract the cation by the exchanger but the lowest temperature which can economically be secured should be used down to, of course, the point at which there is difficulty with freezing.

It will be apparent that the pH may be held within the desired ranges during the cation exchange by expedients other than that already mentioned. One may, for instance, bring the aqueous silicate solution into contact with the cation exchange resin at a venturi or in a simple pipe together with an amount of acid to give the desired pH. Intimate mixing will result in either case if the flows are rapid and turbulent. Successive additions of the aqueous silicate solution can be made at subsequent points of flow or, as is more customary, by recirculation. Contact at a pH within the desired range may effectively be controlled, for instance, by bringing an aqueous silicate solution into a stream of a cation-exchanger in an aqueous medium of a pH within the desired range. The stream would then be discharged into a receptacle and a portion withdrawn from the receptacle for return to the point of addition of a further quantity of the aqueous silicate solution. The silicate could, as previously indicated, be introduced at a venturi or simply into a flowing stream in a pipe, the stream moving at a sufficient velocity to create a turbulent flow.

The aqueous solution of an acid in which the cation-exchanger is initially contained may be made up at the desired pH by the use of a suitable acid. One may use, for instance, the mineral acids such as sulfuric, hydrochloric, nitric, phosphoric, and sulfamic. Alternatively, one may use such acids as formic acid, acetic acid, and the like. Having prepared one batch or quantity of a sol at a pH in the desired range, the sol may be used as the acid medium and exchanger and aqueous silicate solution may be added to it. It is to be noted that hydrofluoric acid is to be avoided. Hydrofluoric acid on account of its great activity is not ordinarily employed with cation-exchangers and as has already been observed it would have the further difficulty that it would here accelerate polymerization. The regenerated resin must contain strongly acidic groups in order to remove the sodium, potassium, or other cation and a suitably strong acid must accordingly be used for regeneration in conformity with known practices.

It will be evident that in accordance with customary practices the quantity of the cation-exchanger should be such in relation to the amount of silicate that it will effect substantially complete removal of cation. It will be seen that if aqueous silicate solution is added after the cation-exchanger is nearing exhaustion the pH will begin to rise above the indicated range. At this point the addition of aqueous silicate solution should be discontinued or else a further quantity of cation-exchanger must be added.

It will be seen that the quantity of the aqueous acid solution is comparatively unimportant providing the aqueous solution has the pH already indicated. There must obviously be enough of the aqueous acid solution to maintain the system in a homogeneous condition with respect to pH while on the other hand there should not be so large an amount as to make the sol too dilute. Generally the amount of the aqueous acid should be held to a minimum which will allow the cation-exchanger to be thoroughly wetted and homogeneously contacted with the aqueous silicate solution.

While as has been indicated above a silicate solution for treatment according to the invention may be as concentrated as desired and, while the quantity of the aqueous acid solution may be held to a minimum, the final solution obtained should nevertheless be moderately dilute if the sols obtained are to be stable. The processes described will produce sols of substantially the molecular weight of the aqueous silicate solution which was used as a starting material, but if the sols obtained are too concentrated they will rapidly polymerize. This polymerization is most rapid with sols which are of lowest molecular weight.

Therefore, the total quantities of water used should be so adjusted that the final sol will not contain more than about 5 or 6% $SiO_2$ for the higher molecular weight sols such as might be produced from a 3.25 ratio silicate. Even at these concentrations polymerization will proceed with some rapidity.

Sols of very low molecular weight should not exceed, say, 2% or preferably 1½% or less of $SiO_2$. For increased stability even more dilute sols should be prepared. For instance, one may prepare quite stable sols of very low molecular weight which contain about ½% $SiO_2$. The sols may contain lesser amounts of $SiO_2$ with still further stability.

The concentrations of the sol can easily be adjusted by a consideration of the amount of water added in the aqueous silicate solution and present in the aqueous acid solution. Preferably the bulk of the water will be added in the aqueous acid solution for, as has already been noted, it is preferred that the silicate solution contain at least 1% of silicate.

After the cation has been substantially all removed from the aqueous silicate solution as above described the resulting sol is separated from the cation-exchanger. As separated from the exchanger it will have a pH within the indicated ranges.

This product will still contain traces of the cation because of an equilibrium with the partially used cation-exchanger. A further removal of cation may be effected by a contact of the sol with fresh cation-exchanger. This may conveniently be done by passing the aqueous sol thru a bed of fresh exchanger in its hydrogen form prior to use of the exchanger for the first steps of the process. No addition of aqueous acid need be made to the exchanger in this second step since the sols are already at a pH within the desired range.

The sols produced by processes of the invention are of a molecular weight corresponding to the aqueous silicate used and may be prepared at quite low molecular weights. These sols may be used for the various purposes for which silica sols have heretofore been employed. These sols will be found particularly advantageous for use in film-forming compositions and in binding compositions. These sols may also be applied advantageously to paper.

In order that my invention may be better understood reference should be had to the following illustrative examples:

Example 1

One hundred and twenty parts by weight of "Dowex 50" was slurried in 400 parts by weight of 0.01 molar solution of sulfuric acid. The pH of this mixture was about 2. Separately there was prepared 400 parts of a solution of sodium silicate having a weight ratio of $SiO_2:Na_2O$ of 3.25, and containing 2.0% by weight of $SiO_2$. This solution was added to the suspension of resin with vigorous agitation, the temperature of the mixture being maintained between 0 and 5° C. The uniform rate of addition of the aqueous silicate solution to the resin suspension was so adjusted that the addition was completed in 70 minutes. The pH did not rise above 3.5 during the addition as determined with a glass-electrode pH meter. The final mixture was then filtered in order to remove the resin from the solution.

The pH of the filtrate was found to be 2.43. The polymerization number of the silicic acid in the solution so obtained was found to be 4.7. The polymerization number is the average number of silicon atoms per molecule, as calculated from the freezing point depression caused by the silicic acid in the solution.

The advantage in preparing silicic acid by this method from the standpoint of avoiding polymerization of the material during ion exchange is shown by comparing the above results with the preparation of a silicic acid sol from an identical sodium silicate solution by passing the latter through a column of ion exchange resin in accordance with prior art techniques. The polymerization number of a sol prepared by the prior art method is substantially higher, usually ranging from 15 to 20.

Following the procedure as shown about a potassium silicate solution may be treated with "Dowex 50" with the production of a low molecular weight silica sol.

Example 2

The following example demonstrates the preparation of monosilicic acid from sodium orthosilicate. Two hundred and ten parts by weight of "Dowex 50," dried at 90° C. in air, in its hydrogen form, was slurried in 500 parts by weight of 0.01 molar (0.02N) aqueous solution of sulfuric acid of pH 1.8. This slurry was cooled to about 1° C., after which time 250 parts by weight of a solution containing 6% of solid sodium orthosilicate was added. This solid sodium orthosilicate contained 29.06% $SiO_2$ and 61.31% $Na_2O$ by weight. The solution of sodium orthosilicate was added slowly and continuously to the acidic suspension of resin which was vigorously agitated so as to avoid local high concentrations of the added alkaline solution. During the addition the pH did not rise above 3.

The resulting solution obtained after filtering off the "Dowex 50" resin had a polymerization number of 1.3. The solution was found to contain 0.66% $SiO_2$, at a pH of about 2, and was substantially free from sodium ions. It will be noted that the degree of polymerization is close to 1, corresponding to monosilicic acid. Experience has shown that it is impossible to obtain solutions of silicic acid of such low molecular weight unless the exchange is conducted in a solution which is constantly acidic according to the invention.

Example 3

As an example of the application of this process to conversion of sodium metasilicate solutions to silicic acid, 150 parts by weight of "Dowex 50" ion exchange resin in its hydrogen form, dried at 90° C., was slurried in 400 parts by weight of water containing sufficient $H_2SO_4$ to reduce the pH to 1.85. A separate solution of sodium metasilicate was prepared by dissolving 28.4 parts by weight of hydrated crystalline sodium metasilicate ($Na_2SiO_3.9H_2O$) in approximately 495 parts by weight of water. This solution contained 1.13% by weight of $SiO_2$. This sodium silicate solution was added slowly and continuously to the acidic resin suspension with violent agitation over a period of about 30 minutes, the temperature of the mixture being maintained around 5° C. During the addition the pH did not at any time rise above 3.

The resulting mixture was filtered to remove the resin. The filtrate had a pH of 2.1 and contained approximately 0.5% $SiO_2$ by weight. The molecular weight of the silicic acid in this solution, as determined by the freezing point depression method, corresponded to a polymerization number of 1.5.

I claim:

1. The process of preparing a silicic acid sol from an aqueous solution of an alkali metal silicate which comprises adding the solution to an aqueous acidic solution of pH 0.5 to 4 and which contains an insoluble cation-exchanger in its hydrogen form, the addition being effected at such a rate that the pH does not exceed 4, thereafter separating the resulting sol from the cation-exchanger the quantity of the cation-exchanger used being sufficient to absorb substantially all the cation in the quantity of silicate treated.

2. The process of preparing a silicic acid sol from an aqueous solution of an alkali metal silicate which comprises adding the solution to an aqueous acidic solution of pH 1 to 3 and which contains an insoluble cation-exchanger in its hydrogen form, the addition being effected at such a rate that the pH does not exceed 3, thereafter separating the resulting sol from the cation-exchanger the quantity of the cation-exchanger used being sufficient to absorb substantially all the cation in the quantity of silicate treated.

3. The process of preparing a silicic acid sol from an aqueous solution of an alkali metal silicate which comprises adding the solution to an aqueous solution of pH 0.5 to 4 of a mineral acid and which contains an insoluble cation-exchanger in its hydrogen form, the addition being effected at such a rate that the pH does not rise above 4, thereafter separating the resulting sol from the cation-exchanger the quantity of the cation-exchanger used being sufficient to absorb substantially all the cation in the quantity of silicate treated.

4. The process of preparing a silicic acid sol from an aqueous solution of a sodium silicate of $SiO_2:Na_2O$ ratio of 0.5 to 3.9 which comprises adding such an aqueous solution containing at least one percent of the silicate to an aqueous solution of pH 1 to 3 of a mineral acid and containing such quantity of an insoluble cation-exchanger as will absorb substantially all the cation in the quantity of silicate added the rate of addition being such that the pH does not exceed 3, thereafter separating the resulting sol from the cation-exchanger.

5. The process of preparing a silicic acid sol from an aqueous solution of a sodium silicate of $SiO_2:Na_2O$ ratio of 0.5 to 3.9 which comprises adding such an aqueous solution containing at least one percent of the silicate to an aqueous solution of pH 1 to 3 of a mineral acid and containing such quantity of an insoluble cation-exchanger as will absorb substantially all the cation in the quantity of silicate added the rate of addition being such that the pH does not exceed 3, thereafter separating the resulting sol from the cation-exchanger and thereafter contacting the sol with a fresh insoluble cation-exchanger in its hydrogen form to remove traces of the cation.

RALPH K. ILER.

REFERENCES CITED

The following references are of record in the file of this patent:

UNITED STATES PATENTS

| Number | Name | Date |
|---|---|---|
| 2,244,325 | Bird | June 3, 1941 |
| 2,276,314 | Kirk | Mar. 17, 1942 |
| 2,419,272 | Marisic et al. | Apr. 22, 1947 |
| 2,438,230 | Ryznar | Mar. 23, 1948 |

OTHER REFERENCES

Ryznar: "A New Method of Preparation and Purification of Some Hydrous Oxide Sols," Colloid Chem., Alexander, vol. VI, 1946, pp. 1113–1117, Reinhold Pub. Corp.